US008439439B2

(12) United States Patent
Meeker et al.

(10) Patent No.: US 8,439,439 B2
(45) Date of Patent: May 14, 2013

(54) ADJUSTABLE SHOULDER BELT PATH FOR A BOOSTER CAR SEAT

(75) Inventors: Paul K. Meeker, Hiram, OH (US); William Gibson, Kent, OH (US)

(73) Assignee: Meeker R &D, Inc.

( * ) Notice: Subject to any disclaimer, the term of this patent is extended or adjusted under 35 U.S.C. 154(b) by 452 days.

(21) Appl. No.: 12/640,552

(22) Filed: Dec. 17, 2009

(65) Prior Publication Data

US 2011/0148160 A1 Jun. 23, 2011

(51) Int. Cl.
*A47D 1/10* (2006.01)
*A47D 15/00* (2006.01)

(52) U.S. Cl.
USPC ...................................... 297/250.1

(58) Field of Classification Search ............... 297/250.1, 297/484, 483, 473, 216.11, 219.12
See application file for complete search history.

(56) References Cited

U.S. PATENT DOCUMENTS

| 5,845,967 | A | 12/1998 | Kane et al. |
| 6,079,780 | A | 6/2000 | Bapst |
| 6,637,826 | B2 | 10/2003 | Takayama |
| 6,659,564 | B2 | 12/2003 | Kassai et al. |
| 6,705,675 | B1 | 3/2004 | Eastman et al. |
| 6,857,700 | B2 | 2/2005 | Eastman et al. |
| 6,893,094 | B2 | 5/2005 | O'Connor |
| 7,232,185 | B2 | 6/2007 | Hartenstine et al. |
| 7,510,242 | B2 * | 3/2009 | Yumoto et al. ............. 297/250.1 |
| 2004/0113411 | A1 | 6/2004 | Djien |
| 2009/0179469 | A1 * | 7/2009 | Bass ........................ 297/216.12 |

FOREIGN PATENT DOCUMENTS

| GB | 2 375 330 A | 11/2002 |
| WO | 20071107881 A1 | 9/2007 |

OTHER PUBLICATIONS

PCT/US2010/060166 International Search Report and Written Opinion dated Feb. 14, 2011.
PCT/US2010/060166 International Preliminary Report on Patentability dated Jun. 19, 2012.
www.carseatblog.com/?p=4701, "Combi Kobuk Review: Belt Positioning Booster with Unique Features," Oct. 21, 2009.
www.safety1st.com/usa/eng/Products/Travel/Car-Seats/Convertible-Car-Seats/Detail..."Alpha Luxe Echelon Convertible Car Seat." Publication date unknown.
www.safety1st.com/usa/eng/Products/Travel/Car-Seats/Booster-Car-Seats/Details/.."Vantage High Back Booster Car Seat." Publication date unknown.

* cited by examiner

*Primary Examiner* — Milton Nelson, Jr.
(74) *Attorney, Agent, or Firm* — Hahn Loeser & Parks LLP

(57) ABSTRACT

A shoulder belt adjustment mechanism for a booster car seat is described in which the belt guide adjustment is adjustable to one of at least two positions along a linear or nonlinear adjustment axis and wherein each adjustment axis is along a portion of a line formed by an intersection of two planes formed by a vertical splay plane formed by an outer shell of said wings and an angled declination plane formed generally along said lower edges of said wings.

27 Claims, 14 Drawing Sheets

ADJUSTABLE SHOULDER BELT PATH FOR A BOOSTER CAR SEAT

TECHNICAL FIELD

The invention relates generally to a child's booster car seat with an adjustable belt guide used in conjunction with an automobile 3-point lap/shoulder belt and which aids in optimal positioning of the automobile shoulder belt on a child in spite of wide variations in automobile lap/shoulder belt mounting positions relative to automobile seats and variations in child size.

BACKGROUND OF THE INVENTION

Passenger restraint seat belt systems in automobiles are generally well suited to properly restrain adults in a crash situation, but not so well suited to properly restrain children. Accordingly, vehicle restraint systems are often supplemented by devices such as booster seats, which may be broadly defined as auxiliary seats upon which or in which children of a certain age and size sit and wherein both the booster seat and the child are restrained by an automobile 3-point lap/shoulder belt, and wherein the booster seat redirects the automobile 3-point lap/shoulder belt to a more advantageous path for the child.

Adult lap/shoulder belt systems are sized and positioned for adults and known to be less adequate for children as they are sized and located such that the automobile lap belt generally falls dangerously across a child's soft abdomen rather than across the child's bony pelvis. Further, automobile shoulder belts are anchored, at their top end, far from a child's shoulder and can fall either off the child's shoulder or across the child's face. The combination of deficiencies is addressed by belt positioning booster car seats, which attempt to reposition automobile lap/shoulder belts more appropriately for children.

Belt positioning booster car seats include a seat portion, which elevates a child above a vehicle seat and includes guiding recesses to locate the automobile lap belt forward of the child's abdomen and low on the bony pelvis thus lessening the risk of abdominal injury in a crash. Booster seats may also include a back portion with guiding slots to direct the automobile shoulder belt across the child's shoulder and chest where it can be most effective in restraining the child in a crash situation and also where it is most comfortable.

Belt positioning booster car seats are generally meant for children weighing from about 30 pounds to 80 or even 100 pounds. Seated height and corresponding shoulder height for this weight span varies greatly. Accordingly, some booster seats are equipped with a height adjustable headrest with an integral belt guide or a combination backrest and headrest with an integral belt guide in an effort to better accommodate various sizes of children.

However, published studies by the Insurance Institute for Highway Safety (IIHS) have shown that the wide variation in automobile shoulder belt mounting position in various automobiles and seating locations, combined with the wide range of child weights/sizes needing to be accommodated has resulted in less than optimal auto shoulder belt positioning in some instances. Ideally, a belt positioning booster car seat would provide an optimal automobile shoulder belt path across a child's torso for the widest range of children and for the widest range of automobile shoulder belt mounting locations. This invention addresses a solution to this need with an adjustable, easy to understand, easy to use, reliable, and inexpensive to manufacture shoulder belt-positioning means.

Although proper belt positioning is the primary goal of the invention, ease of use has become extremely important in evaluating children's car seat as it is considered directly indicative of the likely correct use. The United States government, through the National Highway Traffic Safety Administration, has begun to evaluate children's car seats for ease of use and grades seats via a star rating system. In addition to proper belt positioning this invention particularly addresses proper belt positioning that is also easy to use and therefore provides superior safety, both directly and obviously through proper belt positioning, but also indirectly and less obviously through being especially easy to understand and easy to use.

SUMMARY OF THE INVENTION

A first embodiment of the belt positioning booster car seat of the current invention builds on that described in U.S. Pat. No. 6,908,151 although it need not fold as illustrated in the '151 patent. As such, it is an auxiliary seat for use by a child weighing from approximately 30 to 80 or 100 pounds and is used in conjunction with an automobile seat and automobile combination lap/shoulder belt. The booster seat is positioned on the auto seat and the child sits in the booster seat. Both are then restrained against potential crash forces by the automobile lap/shoulder belt.

The booster seat has a seat with raised side edges and each raised side edge has an automobile seat belt guiding recess. The booster seat also may have a telescoping, height adjustable back with the back being further divided into a contiguous backrest and a headrest partially separated by inward projecting recesses. The backrest has a back surface and left and right forward projecting side edges and the headrest also has a back surface and left and right forward projecting side edges referred to as "wings". Each left and right wing has a lower edge defined by the inward projecting recesses and each lower edge has an automobile shoulder belt guide, which may be adjusted forward or rearward to achieve an optimal position to properly locate the automobile shoulder belt across a child's shoulder and chest yet away from the child's neck. The booster seat also has a comfort pad and may, optionally, have a foam liner, armrests, cup holders, and other convenience features such as a folding mechanism, instruction pouch, warning labels, etc.

A second embodiment of the belt positioning booster seat also has a seat with raised side edges and automobile seat belt guiding recesses and a back with a back surface and forward projecting side edges. It may have a height adjustable headrest with a back surface and forward projecting side edges or wings, but in this embodiment, the headrest is independent from the back and the back is fixed in height. The headrest is somewhat narrower than the back and can move vertically generally parallel to the back from a lower position nested in the back to a higher position within or even above the back. Again, each wing has a lower edge and each lower edge has an adjustable automobile shoulder belt guide, which may be moved forward or rearward to achieve an optimal shoulder belt path across the child's chest.

The adjustable belt guides affixed to the lower edges of each forward projecting wing in each of the described embodiments are generally "C"-shaped; each with a narrow opening which generally faces downward. Each belt guide is adjustable generally along a portion of the lower edge of its forward facing wing so that it may be closer to the headrest back surface or further from the headrest back surface. The adjustment may be discrete or continuous and the extent of adjustment is at least ½ inch and preferably at least 1 inch. In one instance, a back axis is defined by intersecting a plane approximating the plane of the seat back (which generally has some slight curvature but which can be approximated by a plane) and the center plane of the booster car seat. A splay angle plane is defined as passing through the back axis and angled outward from approximately 0° to 45° to the center plane of the booster car seat. Further, a splay plane is defined as offset outwardly from the splay angle plane. Finally, the belt guide, in its adjustment, travels on an adjustment axis defined by the intersection of the offset splay plane and a declination plane normal to the seat center plane and declined from the seat back plane by approximately 80° to 150° forward. This arrangement of planes creates an adjustment axis that may approximate the wing lower edges but may also be distinct and divergent from those edges.

Each embodiment described also shows different adjustable belt guide mounting means and a different belt guide adjustment means, each of which, and variations of which, could be used on either embodiment.

In one embodiment, each generally "C"-shaped belt guide has a belt guide extension and a belt guide length. The belt guide length may be the overall length of the belt guide extension, but need not be. The belt guide extension slideably mounts into a respective belt guide channel. The belt guide length is shorter than belt guide channel length and the belt guide may slideably travel a distance equal to approximately the difference between the belt guide channel length minus the belt guide length.

It is intuitive that moving a belt location guide up or down with a headrest would enable it to position a shoulder belt at a proper height. It is also intuitive that moving an adjuster in or out relative to a seat center plane would aid in obtaining proper lateral shoulder belt placement. It is not obvious or intuitive that moving an adjuster forward or rearward relative to the seat back would aid in proper lateral placement. But, by empirical testing designed to vary shoulder and lap belt anchor locations through all ranges generally found in automobiles, the shoulder belt location in the embodiment seats could be adjusted to optimal position on various anthropomorphic test dummies representing the recommended usage weights. Thus, although not intuitive or obvious, the adjuster location and movement described is effective.

Other belt positioning booster seats have automobile shoulder belt guides. U.S. Pat. No. 6,908,151 illustrates one version where the shoulder belt guides are affixed to the lower edge of an adjustable headrest but where the attachment is on the plane of the back of the headrest and where the guides do not adjust. This design, when tested as described above, is less effective in positioning an automobile shoulder belt to an optimal position with various automobile belt locations and child sizes.

U.S. Pat. No. 5,997,098 as well as U.S. Pat. No. 7,229,132 illustrates a plurality of notches affixed to the raised sides of a seatback. These notches do provide some vertical adjustment by placing the automobile shoulder belt in alternative positions, but provide no lateral adjustment and control the automobile shoulder belt farther away from a child and thus with less precision.

U.S. Pat. No. 6,464,294 shows an adjustable shoulder belt guide affixed to raised seatback sides and an adjustable headrest. This adjustment does not provide any lateral adjustment, is not keyed to the headrest adjustment, and again, controls the automobile shoulder belt farther from a child and thus with less precision.

Combi International illustrates adjustable belt guides which slide outward behind a height adjustable headrest. These belt guides lie against the auto seat back and are thus less accessible. In addition, the adjustment control is hidden on the back of the booster seat where it is completely inaccessible in an in-use situation. Also, the guides cantilever a long distance and may be less stable or need more reinforcing.

In addition to being empirically successful in optimally positioning an automobile shoulder belt, the current invention solves several other deficiencies of current designs. First, the "C"-shaped guide, being mounted on the lower edge of the forward facing wing is accessible for routing the automobile shoulder belt. If the belt guide were located on the lateral plane of the headrest back surface, it would likely have its access limited by lying on the automobile seat. Second, assuming that the adjustment control is located proximate to the belt guide as illustrated in the preferred embodiments, the adjustment control is also exposed where it can be seen, easily understood, and used more easily than if it were mounted on the back of the headrest. Third, mounting a generally downward opening "C" shape on the lower edge of a forward facing wing suggests a direct and close mounting of the long upper edge of the "C" thus minimizing strength requirements and enhancing system rigidity.

Therefore, what has been described will include: a booster car seat with a seat and a back and a headrest in which there is a headrest back surface interposed between left and right forward extending side wings, each wing with a lower edge; and a left and a right belt guide proximate each of the lower edges and wherein each belt guide is adjustable to one of at least two positions along its adjustment axis and wherein each adjustment axis is along a portion of a line formed by an intersection of two planes, the intersection formed by, a vertical splay plane offset from a splay angle plane angled to a center line plane and passing through a back axis; and a generally horizontal declination plane normal to the center line plane and angled downward from the seat back axis.

The splay angle plane will be angled relative to the center line plane by an angle that ranges from approximately 0° to 45°; and the declination plane will be angled by approximately 80° to 150° from the seat back plane. In a more preferred embodiment, the splay angle will range from approximately 10° to 30°; and the declination angle will range from approximately 100° to 140°.

The seat will include a mechanism by which the belt guide moves between at least two positions by selective biased engagement between at least one slot and one mating projection. Alternatively, the movement can be between at least two positions by selective biased engagement between two slots and two mating projections. In yet another embodiment, the seat belt guide may move by rotational movement of a threaded screw, or by rotational movement of an internally threaded knob about a mating externally threaded screw, or by rotational movement about an axis normal to the lower edge of each of the wings and insertion of an offset boss into a mating offset hole in the lower edge, or by selective engagement between at least two laterally positioned slots and at least one laterally biased mating projection.

Although the adjustment axis described is created by the intersection of planes, those planes can be describes as surfaces instead planes and may be arced surfaces. Thus, the intersection of the arced surfaces creates an arced adjustment axis and the "C"-shaped adjuster may move on an arced path.

In yet another embodiment, the seat will include a foam inner liner interior of the outer shell of the wings, the inner liner being thicker and curving interiorly at a periphery of the wings.

In one aspect of the invention, a booster car seat is described with a seat and a back and a headrest which includes: a headrest back surface interposed between left and right forward extending side wings, each wing with a lower edge; and a left and a right belt guide proximate each of the lower edges and wherein each belt guide is adjustable to one of at least two positions along its adjustment axis and wherein each adjustment axis is along a portion of a line formed by an intersection of two planes, the intersection formed by a vertical splay plane formed by a parallel plane offset from a plane angled to a vertical centerline plane and which passes through a back axis of the seat; and a horizontal declination plane normal to the centerline plane and declined from the back axis. The seat further includes: a splay angle formed by an intersection of the offset parallel plane and the vertical centerline plane of the seat and wherein the splay angle ranges from approximately 0° to 45° (more preferably 10° to 30°); and a declination angle formed by an intersection of an upward-extending plane approximating a plane along a width of the back of said seat and the declination plane and wherein the declination angle ranges from approximately 80° to 150° (more preferably 100° to 140°. The seat belt guide moves between at least two positions as described above.

In another aspect of the invention, a booster car seat is described with a seat and a back and a headrest wherein: the headrest has a headrest back surface, and left and right forward extending side wings each with a lower edge; a left and a right belt guide proximate each the lower edges and where each belt guide is adjustable to one of at least two positions nearer or farther from the headrest back surface; and wherein the at least two positions lie on a common axis, and wherein the common axis is determined by: a splay approximating the forward extending wings from a center plane of the booster car seat; and a declination from a back surface plane of the seat. The splay ranges from approximately 0° to 45° (more preferably approximately 10° to 30°); and the declination ranges from approximately 80° to 150° (more preferably approximately 100° to 140°). The seat belt guide moves between at least two positions as described above.

In yet another aspect of the invention, a booster car seat is described with a seat and a back and a headrest which comprises: a headrest back surface interposed between left and right forward extending side wings, each wing with a lower edge; and a left and a right belt guide proximate each of the lower edges and wherein each belt guide is adjustable to one of at least two positions along a length of travel along a non-linear adjustment axis; and a means for securing the belt guide in the at least two positions on the non-linear adjustment axis. This non-linear adjustment axis is selected from the group consisting of an arced path, a spline and an irregular curve. In an embodiment, this lower edge is curvilinear and the adjustment axis is curvilinear. Alternatively, the lower edge has a first non-linear geometry and the adjustment axis has a second non-linear geometry, the first and second geometries not being the same, although they can be.

In still yet another aspect of the invention, a booster car seat is described with a seat and a back and a headrest wherein the headrest has a headrest back surface, and left and right forward extending side wings each with a lower edge; a left and a right belt guide proximate each the lower edges and where each belt guide is adjustable to one of at least two positions nearer or farther from the headrest back surface; and wherein each of the at least two positions lie on a common axis. The common axis is determined by an intersection of a splay plane approximating a plane of one of the forward extending wings from a vertical center plane of the booster car seat and a declination plane normal to a center plane of the car seat and angled to a back plane approximating the back surface of the seat. The splay angle is formed by an intersection of the splay plane to the center plane of the seat and wherein the splay angle ranges from approximately 0° to 45° (preferably 10° to 30°); and a declination angle formed by an intersection of the declination plane and the upward-extending plane of the seat back and wherein the declination angle ranges from approximately 80° to 150° (preferably 100° to 140°). The seat belt guide moves between at least two positions as described above.

These and other objects of this invention will be evident when viewed in light of the drawings, detailed description, and appended claims.

BRIEF DESCRIPTION OF THE DRAWINGS

The invention may take physical form in certain parts and arrangements of parts, preferred embodiments of which will be described in detail in the specification and illustrated in the accompanying drawings which form a part hereof, and wherein.

DETAILED DESCRIPTION OF THE INVENTION

Figure 1:
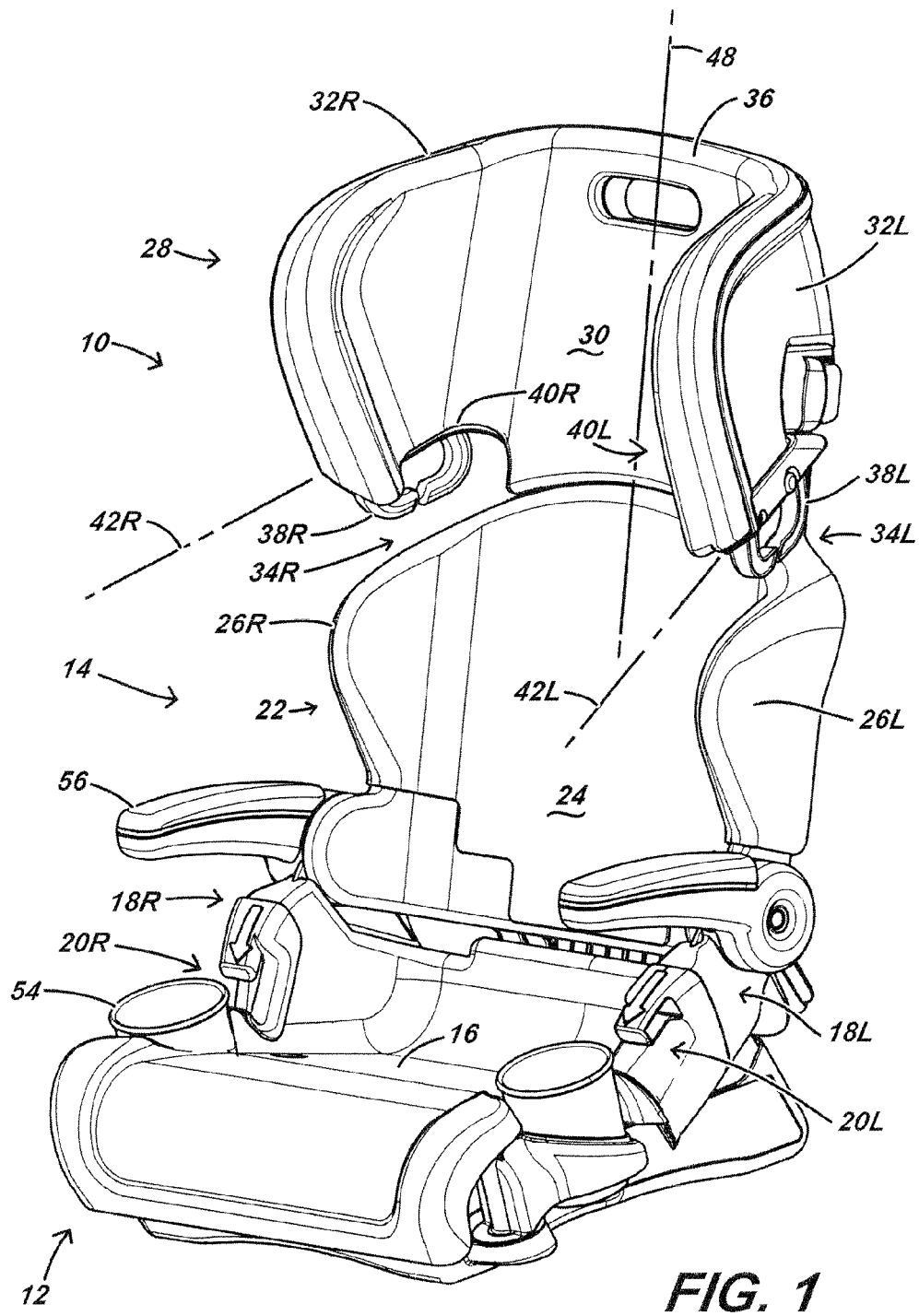
FIG. 1 is a front perspective view of a child's booster car seat showing a headrest with a first configuration of "C"-shaped adjustable belt guides.

The best mode for carrying out the invention will now be described for the purposes of illustrating the best mode known to the applicant at the time. The examples are illustrative only and not meant to limit the invention, as measured by the scope and spirit of the claims.

Referring now to the drawings wherein the illustrations are for purposes of showing the preferred embodiments of the invention only and are not for purposes of limiting the same, they show a child's booster car seat for use in conjunction with an automobile seat and an automobile combination lap/shoulder belt wherein the child's booster car seat has an adjustable headrest with forward projecting side wings and adjustable belt guides for the automobile shoulder belt proximate lower edges of the wings.

In a first embodiment of the invention the adjustable belt guides are mounted on a headrest integral with an adjustable seat back and are guided by moving in channels along defined axes. In a second embodiment, the adjustable belt guides are mounted on an independent adjustable headrest and are guided by bars on defined axes.

Figure 6:
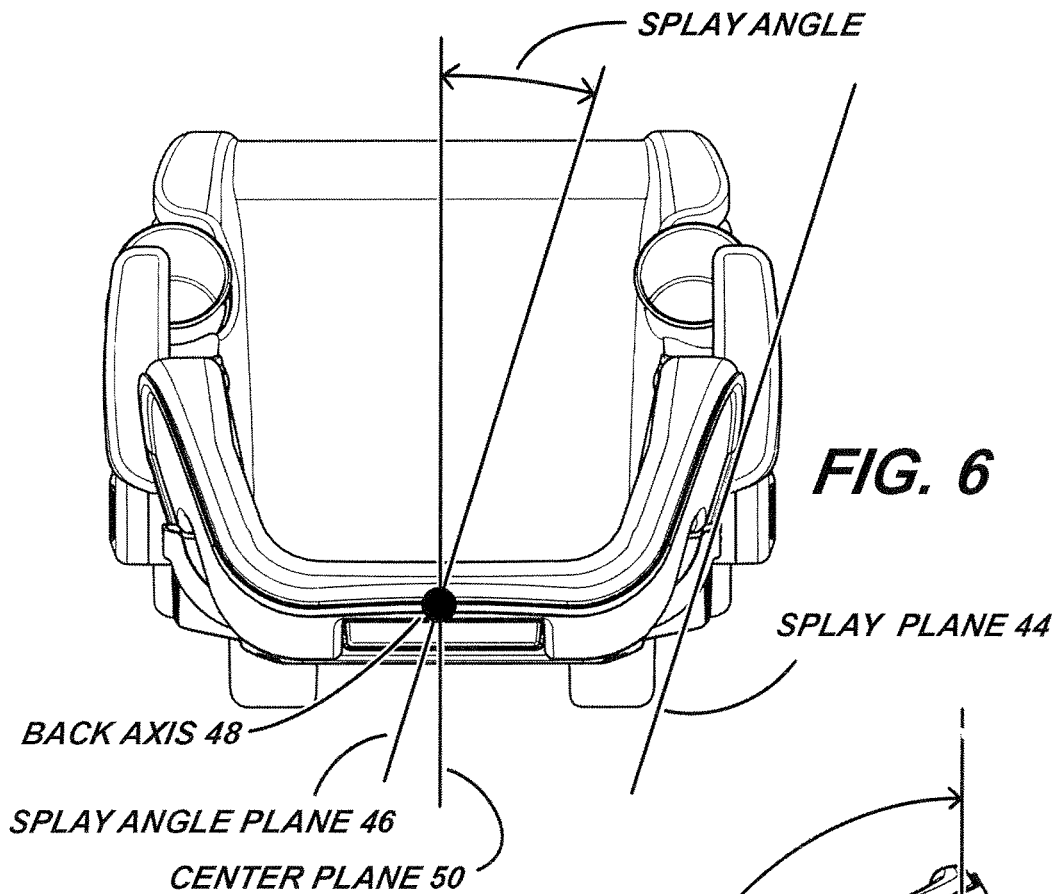
FIG. 6 is a top elevational view illustrating the splay plane, splay angle plane, center plane and splay angle.
Figure 7:
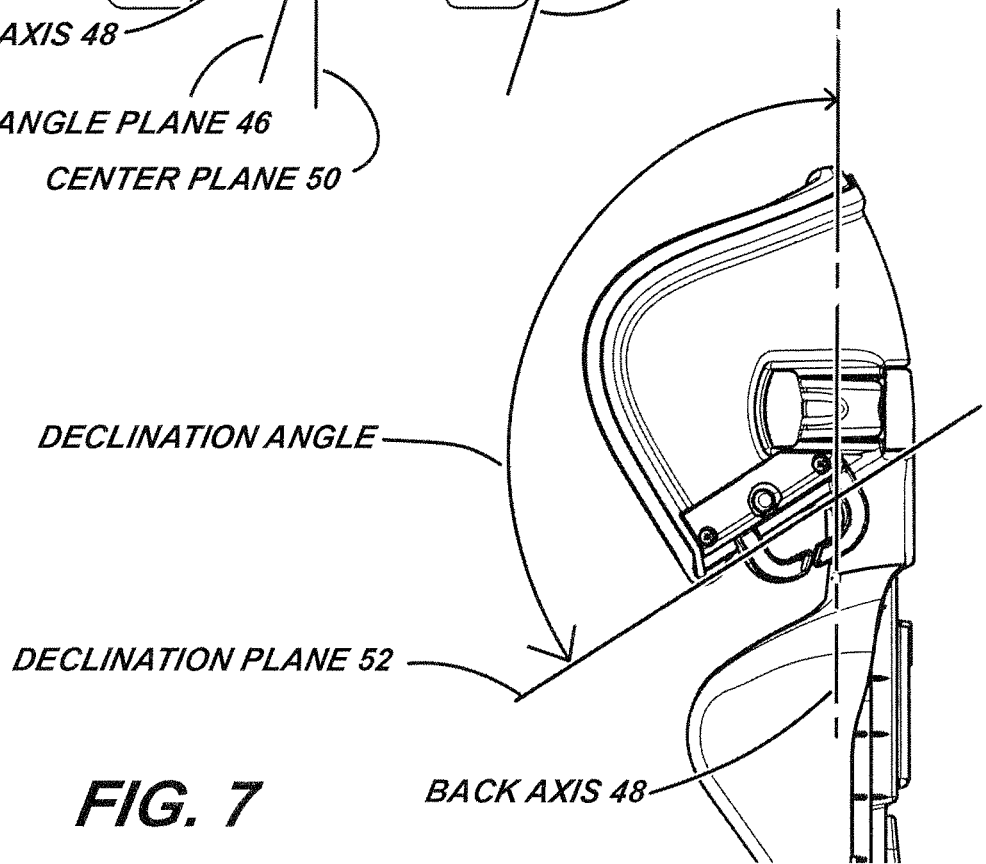
FIG. 7 is a side elevational view illustrating the declination angle, declination plane and back axis.

As illustrated in FIG. 1, the first embodiment of a booster car seat 10 has a seat 12 and a back 14 which may be separable, or permanently attached and, if attached, may be fixed or adjustable or foldable. The seat has a seating surface 16 and raised sides 18L and 18R and automobile seat belt guiding recesses 20L and 20R. Back 14 is divided into a lower back region 22 with a lower back surface 24 and raised lower back sides 26L and 26R and a headrest region 28 with a headrest back surface 30 and forward extending side wings 32L and 32R. The lower back and headrest are partially separated by inward recesses 34L and 34R and adjust vertically by telescoping either at the inward recesses or within the lower back so as to accommodate taller or shorter children. The headrest may have a foam liner 36. The booster car seat also has adjustable "C"-shaped belt guides 38L and 38R proximate lower edges 40L and 40R of forward extending side wings, which can be moved closer to or further from the headrest back surface along adjustment axes 42L and 42R. Although belt guides are ideally "C" shaped, alternate shapes can certainly be used to equal effect such as oval shapes, round shapes, rectangular shapes, "D" shapes, etc., provided that at least one slit or slot be contained within the shape to permit insertion of a seat belt. The belt guides must simply guide an automobile shoulder belt and allow it to be captured in the belt guides and released from the belt guides. Referring to FIG. 6 and FIG. 7, each adjustment axis is defined by the intersection of a splay plane 44 parallel and offset from a splay angle plane 46 passing through a back axis 48 lying on a seat center line plane 50 and angled between approximately 0° (approximately parallel) and 45° to the center line plane 50 of the booster seat (more preferably 10° to 30°) and a declination plane 52 angled from a plane essentially defined by the seat back (recognizing that the seat back has some nominal amount of curvature associated therewith for the comfort of the occupant) and angled between approximately 80° and 150° downward from the seat back plane (more preferably 100° to 140°). The booster car seat may optionally have cup holders 54, armrests 56 and other features such as labels, instruction holders, etc. (not shown). The booster car seat also has a comfort pad, which is immaterial to the invention and omitted for clarity.

Figure 2:
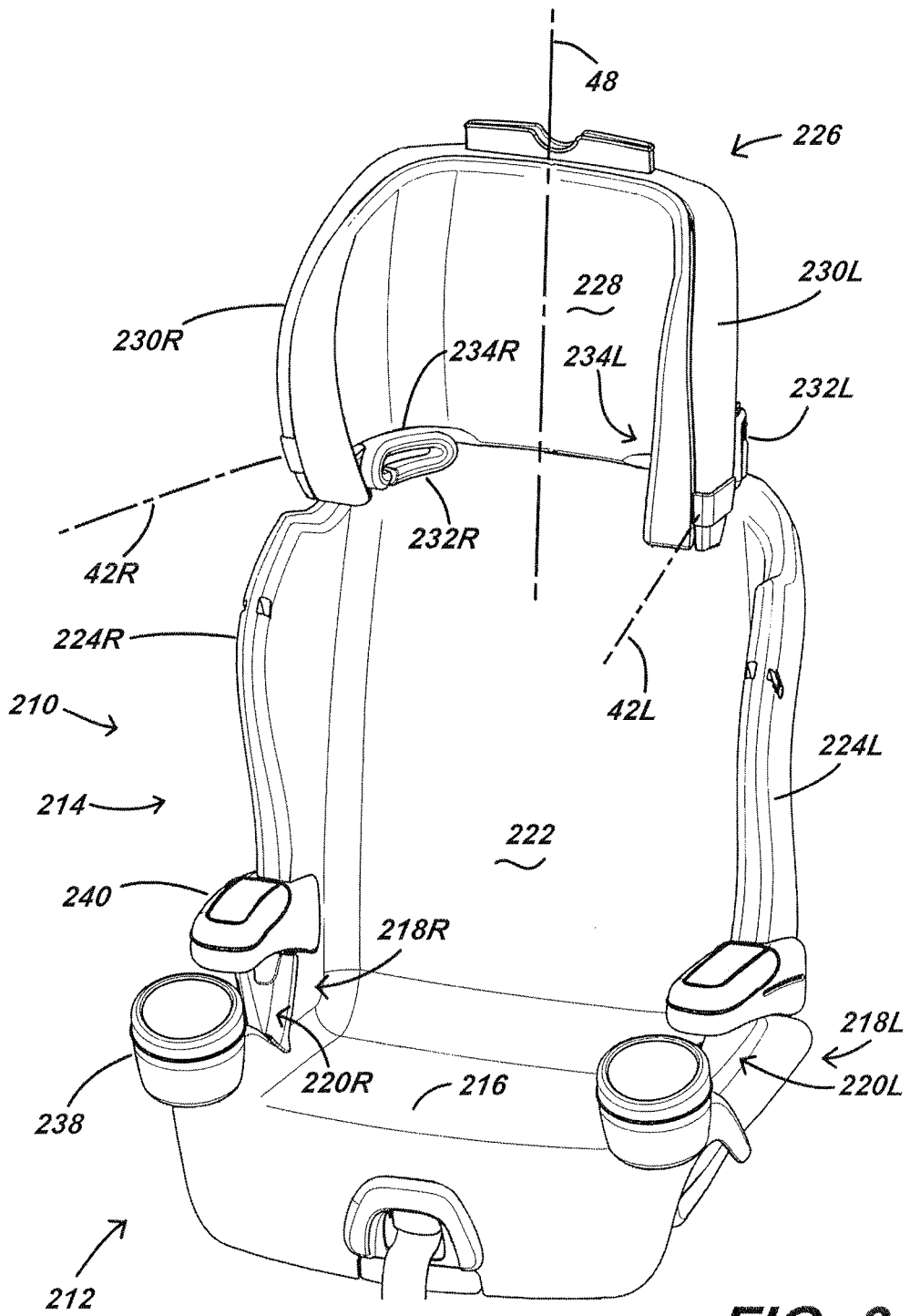
FIG. 2 is a front perspective view of a child's booster car seat showing a headrest with a second configuration of "C"-shaped adjustable belt guides.

FIG. 2 illustrates a second embodiment of a booster car set 210 with a seat 212 and a back 214, which are monolithic. The seat has a seating surface 216 and raised sides 218L and 218R and automobile seat belt guiding recesses 220L and 220R and the back has a back surface 222 and raised sides 224L and 224R. The second embodiment also has an extendible headrest 226 with a back surface 228 and forward extending side wings 230L and 230R. The headrest is smaller in horizontal cross section than the back with its raised sides allowing the headrest to nest within the back or to extend above it or partially above it. The headrest also has "C"-shaped belt guides 232L and 232R proximate lower edges 234L and 234R of headrest forward extending side wings, which can be moved closer to or further from the headrest back surface along adjustment axes 42L and 42R. Referring again to FIG. 6 and FIG. 7, each adjustment axis is defined by the intersection of a splay plane 44 parallel to and offset from a splay angle plane 46 passing through a back axis 48 generally aligned with seat back surface and angled between approximately 0° and 45° inclusive to the center line plane 50 of the booster seat (more preferably 10° to 30°) and a declination plane 52 normal to center line plane and angled between approximately 80° and 150° inclusive downward from the seat back axis 48 (more preferably 100° to 140°). The booster car seat may optionally have cupholders 238, armrests 240 and other features such as labels, instruction holders, etc. (not shown). The booster car seat also has a comfort pad, which is immaterial to the invention and omitted for clarity (except in FIG. 3).

Figure 3:
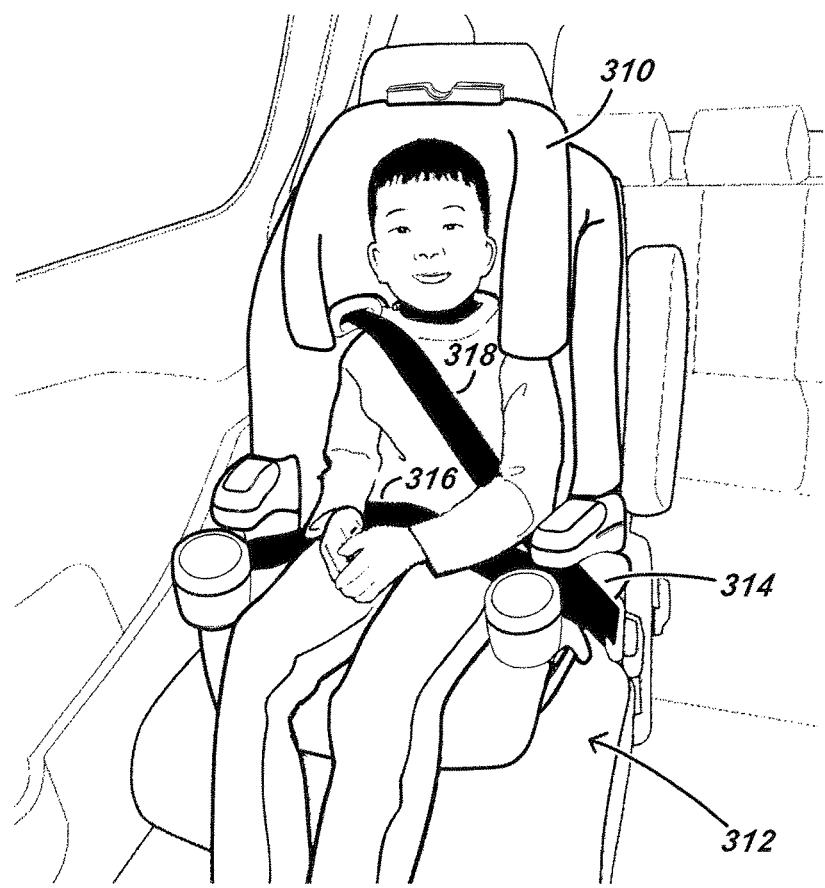
FIG. 3 shows the booster car seat of FIG. 2 installed on an automobile seat with a child seated in the booster car seat and with the child and the booster car seat secured with an automobile combination lap/shoulder belt further illustrating a comfort pad in place on the booster seat.

FIG. 3 shows the second embodiment booster car seat shown in FIG. 2 but with comfort pad 310 shown and installed on automobile seat 312 with a child seated in the booster seat and both secured with automobile combination lap/shoulder belt 314 with a lap belt portion 316 directed through automobile seat belt guiding recesses and shoulder belt portion 318 installed through "C"-shaped belt guides and directed appropriately across the child's shoulder and centered on his chest.

Figure 4:
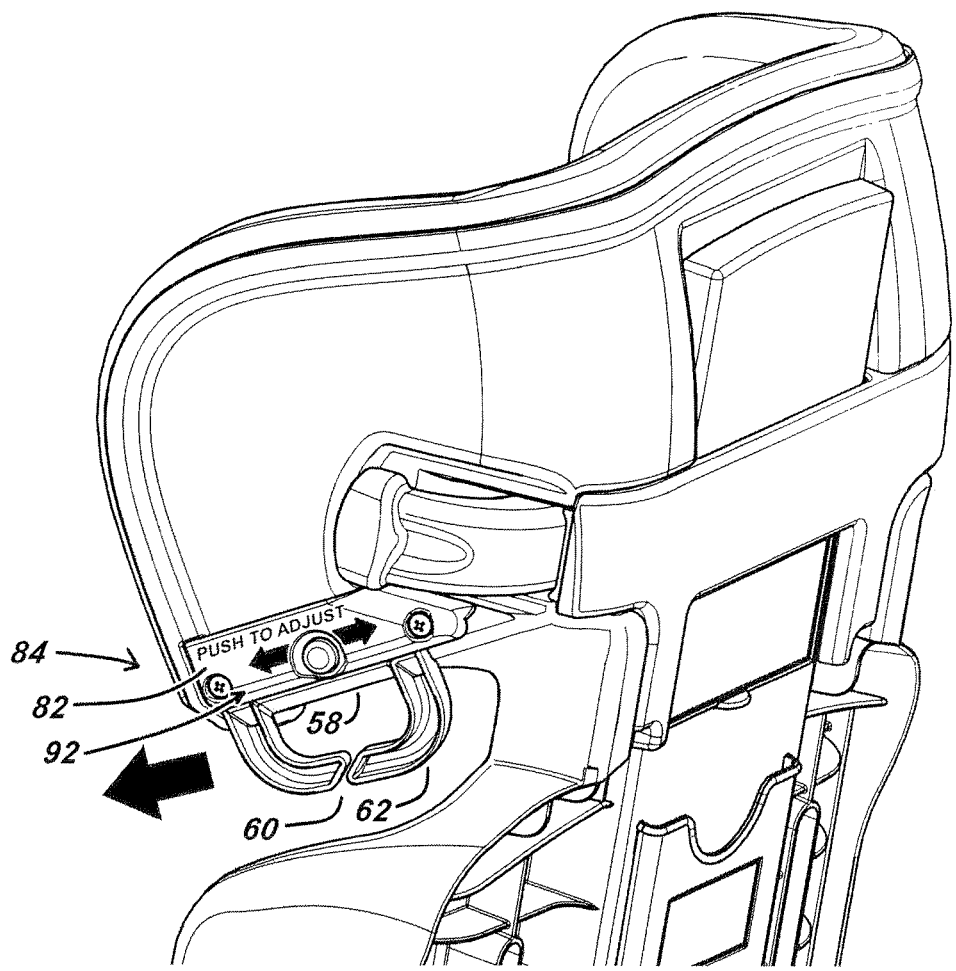
FIG. 4 is a partial rear perspective view of the upper portion of the first configuration of the adjustable belt guide illustrated in FIG. 1 showing a close-up view of the "C"-shaped adjustable belt guide in a forward position.
Figure 5:
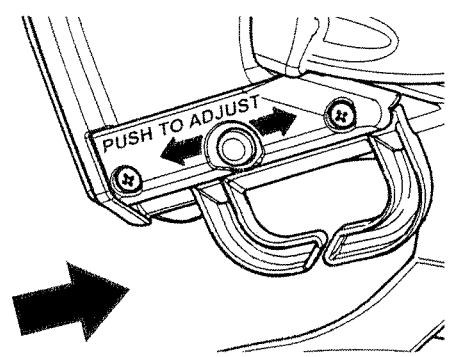
FIG. 5 is an enlarged rear perspective view of the adjustable belt guide illustrated in FIG. 4 showing a close-up view of the "C"-shaped adjustable belt guide in a rearward position.
Figure 10:
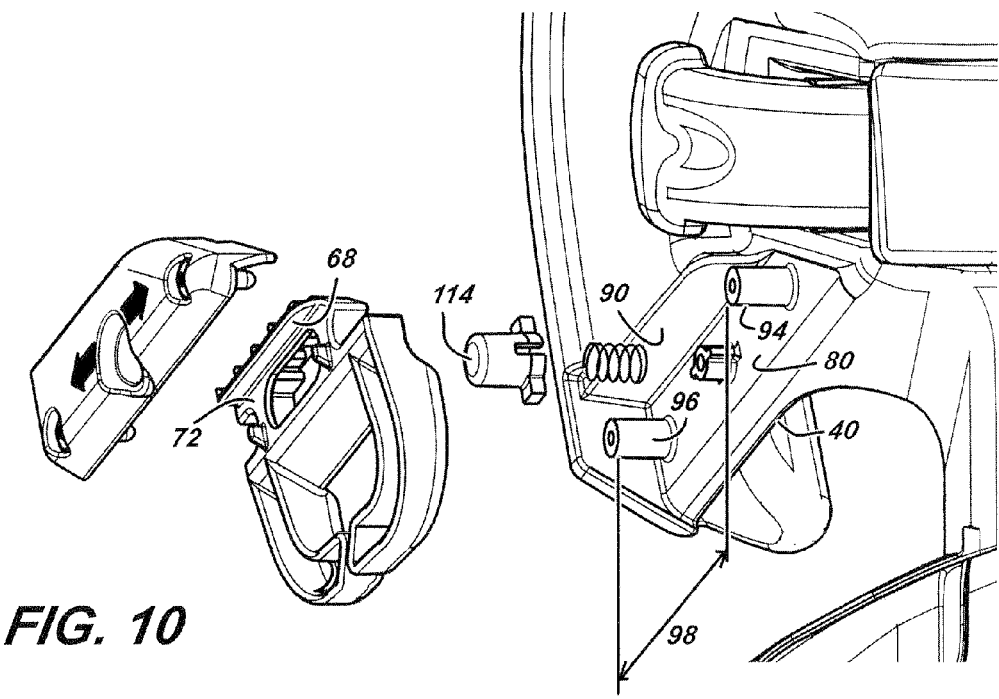
FIG. 10 shows an exploded view of the adjustable belt guide of the first configuration viewed from the rear of FIG. 4.
Figure 11:
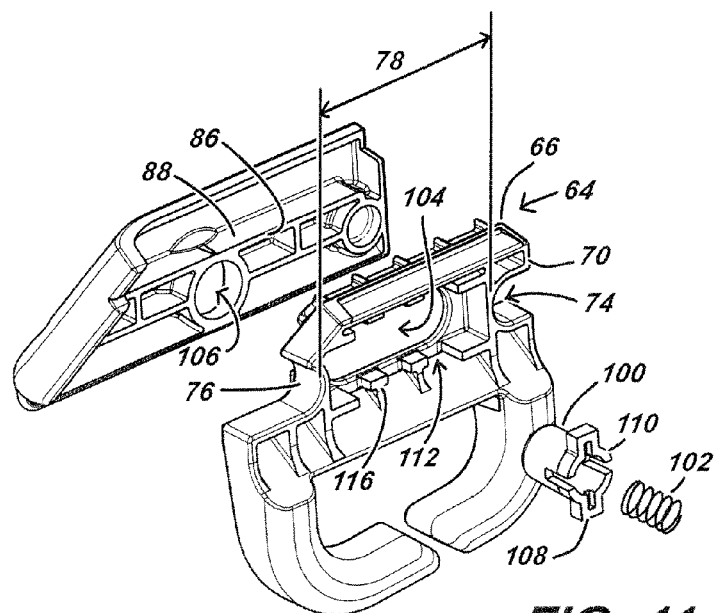
FIG. 11 is an exploded view of FIG. 10 from an alternate angle.
Figure 13:
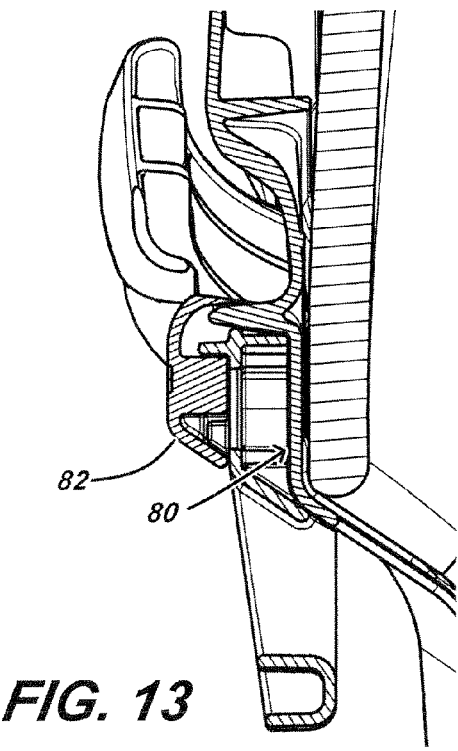
FIG. 13 is a vertical cross-sectional view of FIG. 4 taken along line 13-13 illustrating a section parallel to FIG. 12 and showing the guiding surfaces of the belt guide extension and belt guide channel.
Figure 12:
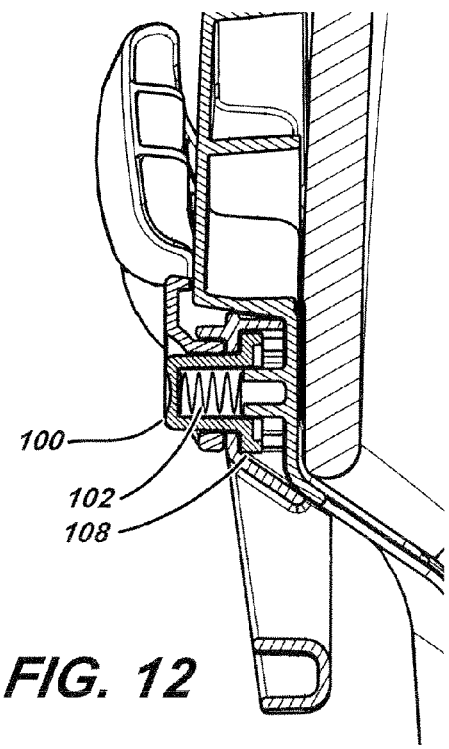
FIG. 12 is a vertical cross-sectional view of FIG. 4 taken along line 12-12 through the position securing means.
Figure 14:
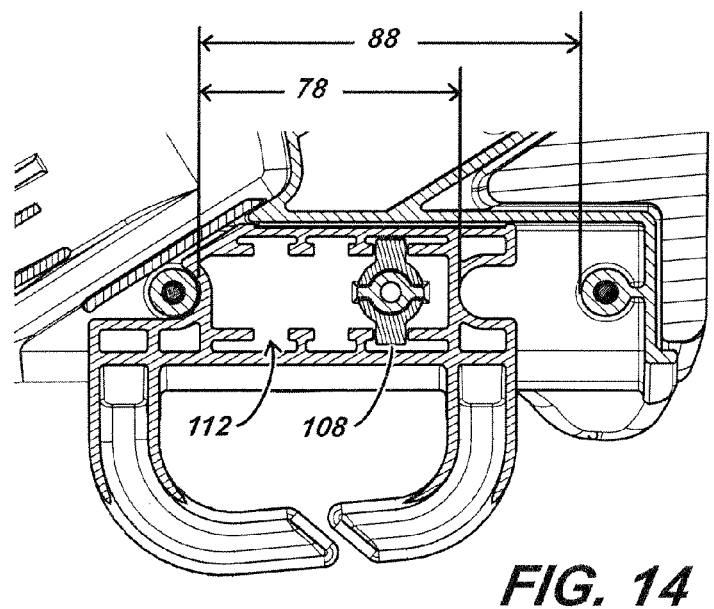
FIG. 14 is an enlarged cross-sectional view of the first configuration of FIG. 1 and is a section parallel to the belt guide showing details of the position securing means.

In the first embodiment and referring to FIG. 4 the "C"-shaped belt guides are oriented with their long backside 58 facing downward and have a relatively small opening 60 in their opposed sides 62. With reference to FIG. 10 and FIG. 11, each belt guide has belt guide extensions 64 extending from the long back side. Each belt guide extension has an upward facing surface 66, a downward facing surface 68, an inward facing surface 70, an outward facing surface 72, a forward facing surface 74, and a rearward facing surface 76. The distance from forward facing surfaces to rearward facing surfaces defines belt guide length 78.

As noted, and now referring to FIG. 4, FIGS. 10-14, the forward extending wings of the headrest have lower edges 40, outward facing surfaces 80 and attached belt guide cover plates 82, which taken together form belt guide assemblies 84. FIG. 11, shows belt a guide cover plate removed and shows inward facing surface 86 and upward facing surface 88. FIG. 10 shows downward facing surface 90. These cooperating surfaces form belt guide channels 92. It is considered that the outward facing surface is on the forward extending wing and the inward facing surface is on the attached cover plate, but the remaining surfaces forming the belt guide channels may be a part of either component. Belt guide channels also have anchor locations, 94, 96 which define belt guide channel length 98.

Each respective belt guide extension is slideably contained in a belt guide channel with upwardly facing surface of belt guide extension proximate downwardly facing surface of belt guide assembly, downwardly facing surface of belt guide extension proximate upwardly facing surface of belt guide assembly, inwardly facing surface of belt guide extension proximate outwardly facing surface of outwardly facing wings, outwardly face of belt guide extension proximate with inwardly facing surface of belt guide assembly, forward facing surface of belt guide extension directionally aligned with rearward facing surface of belt guide assembly, and rearward facing surface of belt guide assembly directionally aligned with forward facing surface of belt guide assembly. The length of the belt guide channel is greater than the length belt guide extension. The belt guide extension may slide in the belt guide channel a distance equal to approximately the difference between the belt guide channel length minus the belt guide length.

In this first embodiment control of the position of the belt guide extension in the belt guide channels, and thus the "C"-shaped belt guides, is achieved by a means of releaseably engaging belt guide extensions with belt guide assemblies. Plunger button 100 is outwardly biased away from the outward facing surface of a respective headrest wing by compression spring 102. The plunger projects slideably through elongated opening 104 in belt guide extension and slideably through opening 106 in belt guide cover plate. The plunger has at least one and preferably two projecting teeth 108 at lower edge 110. These projecting teeth releaseably engage at least two sets of engagement recesses 112 in belt guide extensions. In operation, a user presses outer surface 114 of the plunger button overcoming the outward force of the compression spring and disengaging projecting teeth from engagement recesses. Bypass recess 116 allows the belt guide extension to slide from one possible position to another possible position as long as the button is pushed. When the button is released, the compression spring encourages the projecting teeth into another set of engagement recesses. It is certainly foreseen that minor mechanical details may vary without deviating from the spirit of the invention. For example, the compression spring could be a molded-in plastic leaf spring or other type of common spring. Alternatively, the belt guide channel illustrated and described as being rectilinear in cross section could easily be generally circular or some other geometry in cross section. It is also foreseen that although the path of the "C"-shaped belt guides on belt guide axes is described as linear, it is within the skill of those in the art to arc the path without deviating from the spirit of the invention.

Figure 8:
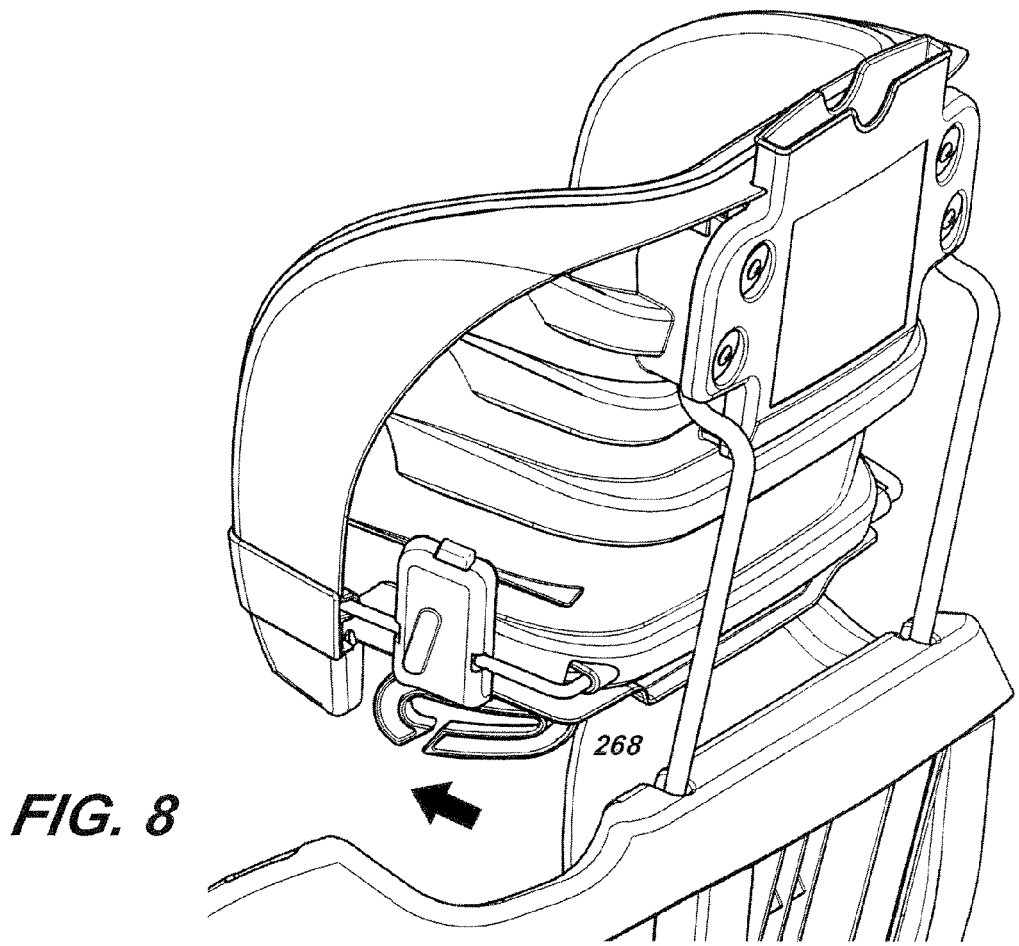
FIG. 8 shows a partial rear perspective view similar to FIG. 4 of the second configuration showing a "C"-shaped adjustable belt guide in a forward position.
Figure 9:
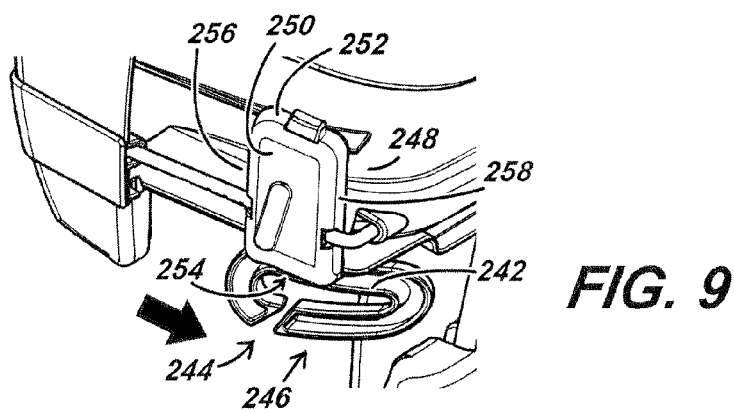
FIG. 9 shows an enlarged rear perspective view of the adjustable belt guide illustrated in FIG. 8 showing a "C"-shaped adjustable belt guide in a rearward position.
Figure 15:
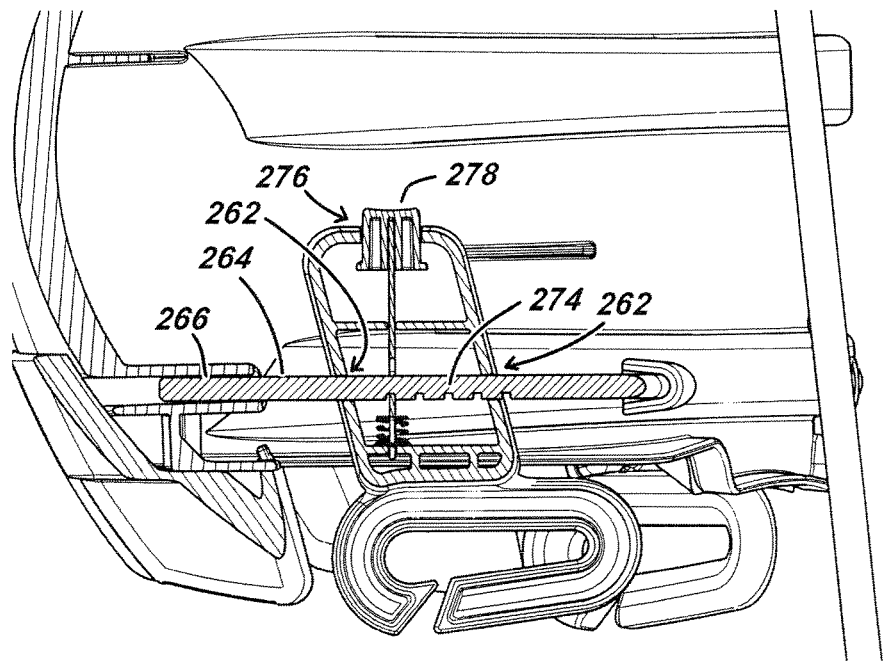
FIG. 15 is a cross-sectional view of the second configuration of the adjustment bar illustrated in FIG. 2 showing the position securing means.
Figure 16:
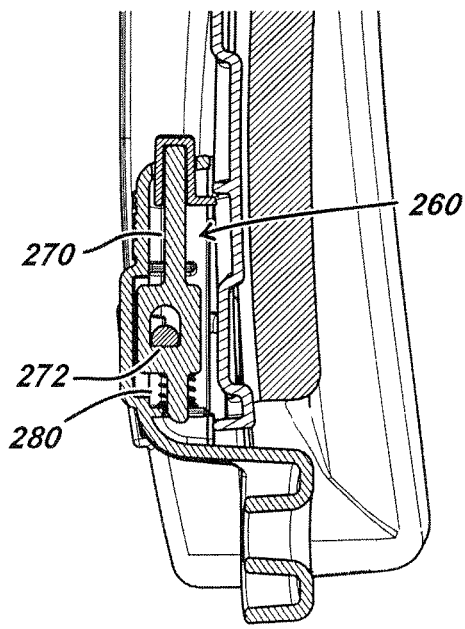
FIG. 16 is a vertical cross-sectional view taken across the position securing means of the second configuration illustrated in FIG. 15.

In the second embodiment and referring to FIG. 8 and FIG. 9, the "C"-shaped belt guides are also oriented with their long back sides 242 facing downward and have a relatively small opening 244 in opposed sides 246 with belt guide extensions 248 extending from the long back side. In this case however, each extension is preferably a thin-walled block with an outer wall 250, top wall 252 bottom wall 254, front wall 256 and back wall 258 and, referring to FIG. 16, is hollow toward the inside 260. As illustrated in FIG. 15, the front and back walls each have a through hole 262 on a common axis and this axis is common with the adjustment axis. Adjustment mounting bar 264 extends slideably through the holes in the front and back walls of the belt guide extension and is secured to the forward extending wing at forward end 266 and, as shown on FIG. 8, at its rearward end 268 so as to position the "C"-shaped belt guide proximate the lower edge of the forward extending wing. The "C"-shaped belt guide can travel forward or rearward on the adjustment-mounting bar. Although shown as round in the figure, the adjustment bar can be the linear expression of any cross-section slideably corresponding to belt guide extension through holes.

Now referring to FIG. 15 and FIG. 16, the second embodiment preferred adjustment means employs a spring-biased plunger 270 with engagement edge 272 mating with one of at least two engagement notches 274 on the adjustment mounting bar. The spring-biased plunger extends through an opening 276 in the top wall of the belt guide extension and is crowned by push button 278, which may slide in the opening in the top wall. The plunger is biased by compression spring 280 encouraging the engagement edge into the engagement notches thus preventing movement of the "C"-shaped belt guide. A user may push the push button, compressing the compression spring and disengaging the engagement edge from the engagement notches and thus allowing forward or rearward movement of the "C"-shaped belt guide to another desired position on the adjustment mounting bar.

Figure 17:
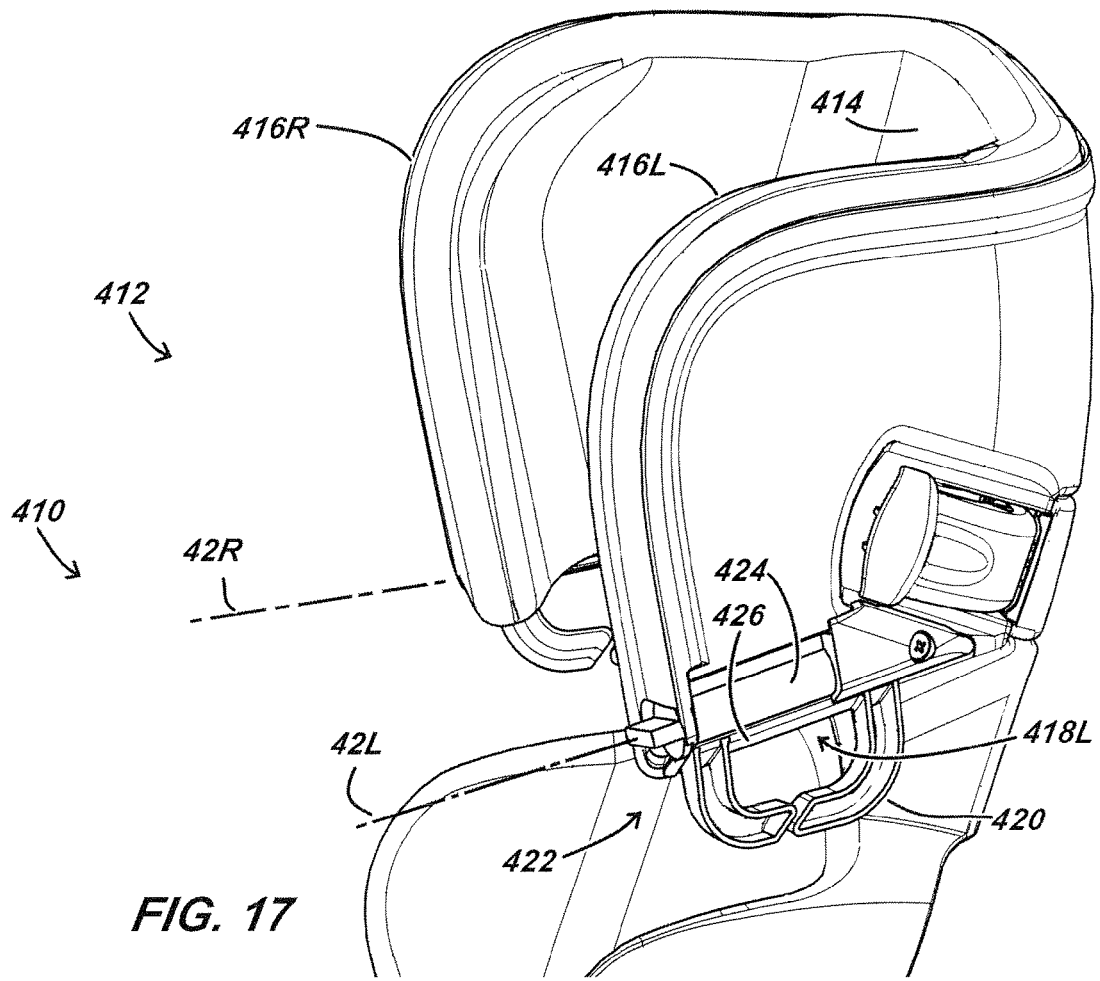
FIG. 17 is a partial side perspective view which illustrates an alternative position for the securing means utilizing a screw thread instead of a spring-biased plunger and where the screw thread is activated from the front of the headrest.
Figure 18:
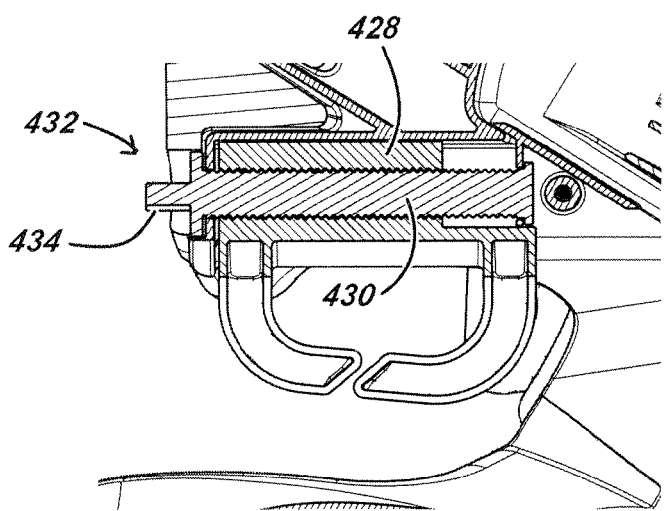
FIG. 18 is a cross-sectional view of the embodiment illustrated in FIG. 17.

FIG. 17 and FIG. 18 show a third embodiment of the "C"-shaped belt guide mounting and adjustment means. The third embodiment is adaptable to the booster car seat structure of either the first embodiment or the second embodiment. Extendible headrest 412 of booster car seat 410 again has a headrest back surface 414 and forward extending wings 416L and 416R with lower edges 418L and 418R. Adjustment axis 42L and 42R are as previously described. "C"-shaped belt guide 420 is aligned with adjustment axis and adjustable toward or away form headrest back surface. In this third embodiment, however, the adjustment is continuous rather than discrete and is controlled by a screw adjustment means 422. Belt guide extension 424 projects off the long back side 426 of the "C"-shaped belt guide and has a threaded section 428 integral and on the adjustment axis. Threaded mounting bar 430 is rotatably secured to forward facing wing proximate lower edge, on the adjustment axis, and passing through the threaded section in belt guide extension. The threaded mounting bar is terminated at its outer end 432 with adjustment knob 434. Turning the adjustment knob drives the "C"-shaped belt guide toward or away from headrest back surface. This adjustment means enjoys the advantages of being highly visible, easily understood, and easily used as it is on the very front of the headrest. As previously noted, ease of use is very important to the overall safe use of a car seat. It also allows a continuous adjustment, is easy and inexpensive to manufacture, and reliable.

Figure 19:
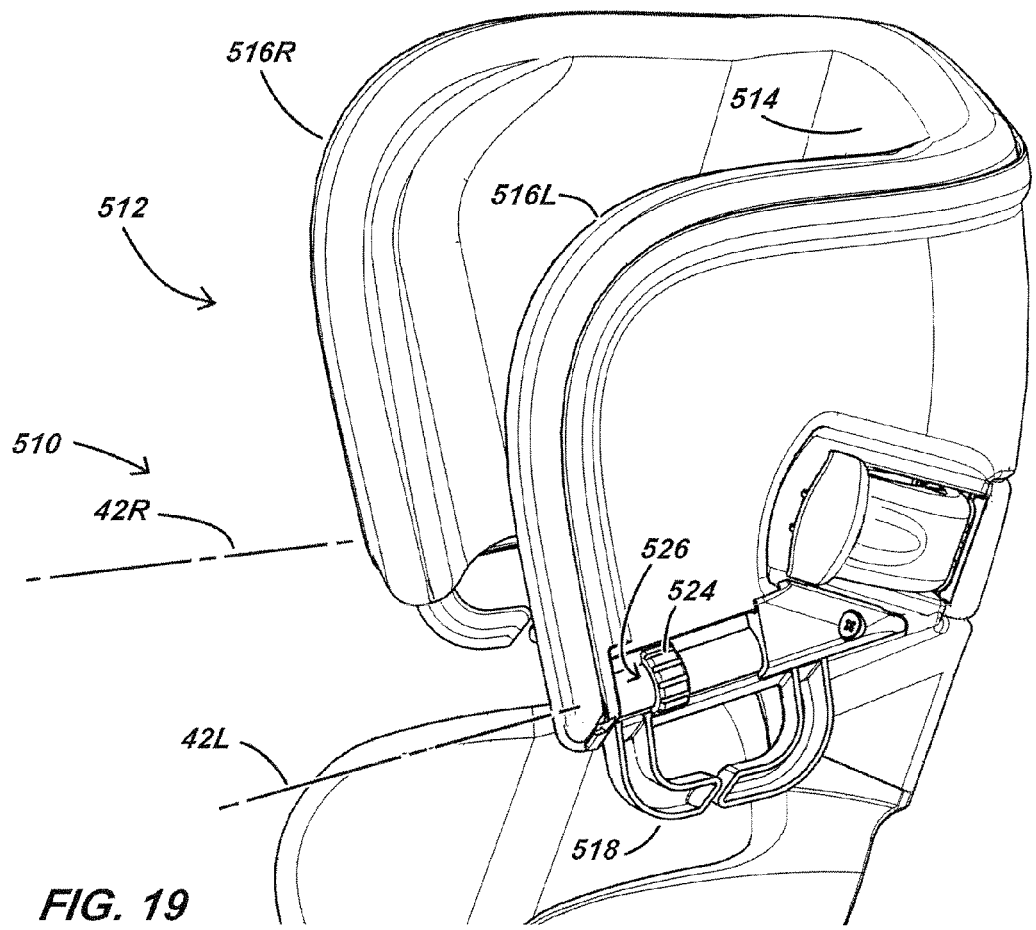
FIG. 19 is a partial side perspective view which shows a second alternative position securing means utilizing a screw thread but where the adjustment is activated from the side of the headrest.
Figure 20:
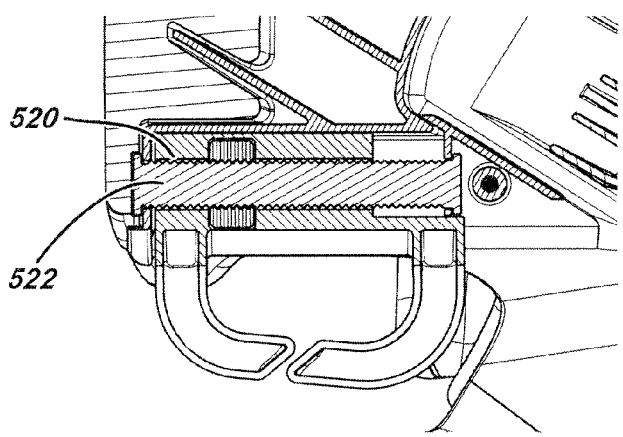
FIG. 20 is a cross-sectional view of the embodiment illustrated in FIG. 19.

FIG. 19 and FIG. 20 show a forth embodiment similar to the third in that the "C"-shaped belt guide is continuously adjustable, driven by a screw thread, easy to understand, easy to use, easy to manufacture, and reliable. Here again, booster car seat 510 has extendable headrest 512 with headrest back surface 514 and forward extending wings 516L and 516R. It also has previously described adjustment axes 42L and 42R upon which "C"-shaped belt guide 518 travels toward or away from headrest back surface. In this iteration a threaded mounting bar 522 is concurrent to each axis and is fixably secured to its forward extending wing and clearance hole 520 which is formed in belt guide extension, also concurrent with axis 42L, which allows "C"-shaped belt guide to slide on the threaded mounting bar. Adjustment nut 524 is engaged with threaded mounting bar and also rotatably engaged into recess 526 in belt guide extension. Turning adjustment nut adjusts "C"-shaped belt guide toward or away from headrest back surface.

Figure 21:
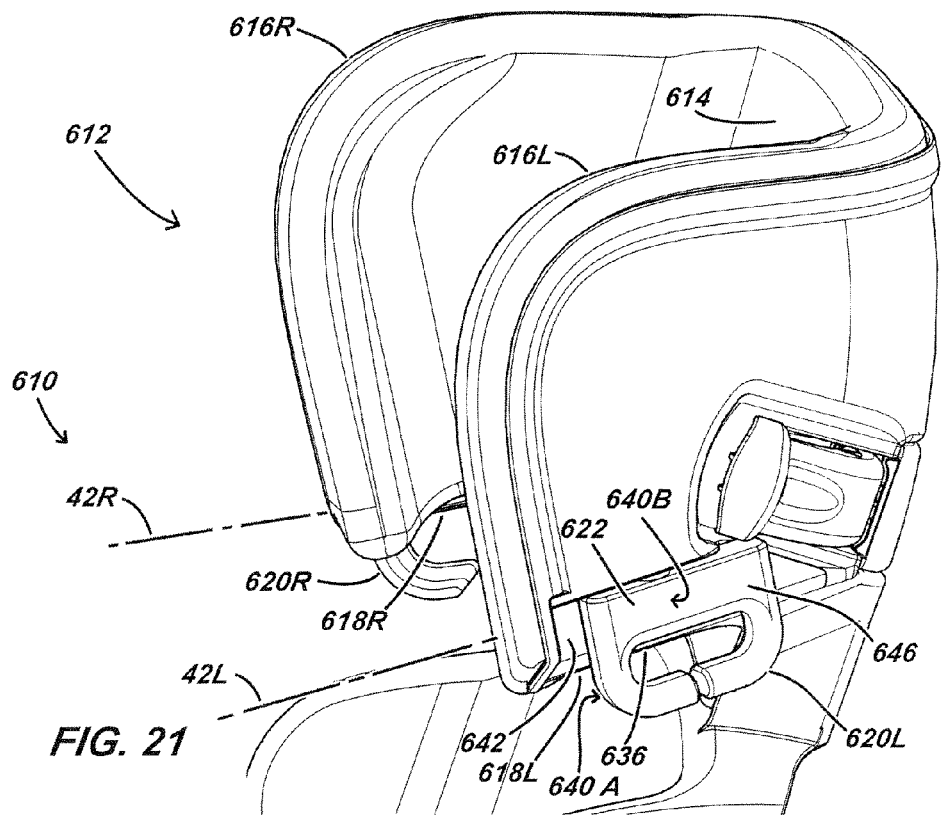
FIG. 21 is a partial side perspective view of an embodiment utilizing a rotating "C"-shaped belt guide with an offset axis to achieve dual positioning of the "C"-shaped belt guide and shows the belt guide in a rearward position.
Figure 22:
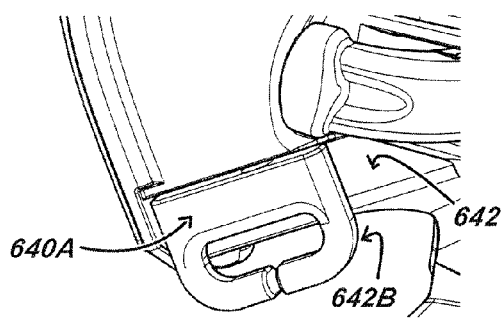
FIG. 22 is a side elevational view and shows the "C"-shaped belt guide of FIG. 21 in a forward position.
Figure 23:
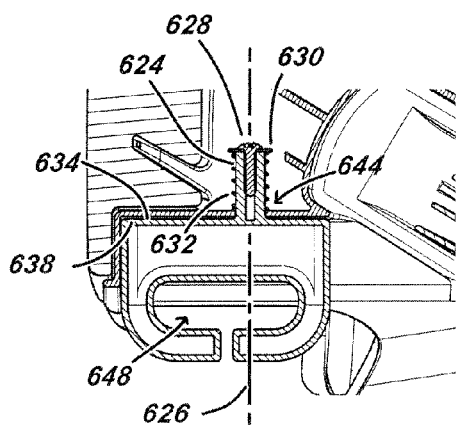
FIG. 23 is a cross-sectional view of the embodiment illustrated in FIG. 22.

Another embodiment is shown in FIG. 21, FIG. 22, and FIG. 23. Here extendable headrest 612 of booster car seat 610 has headrest back surface 614, forward extending wings 616L and 616R with lower edges 618L and 618R and adjustment axes 42L and 42R previously described. "C"-shaped belt guides 620L and 620R align with adjustment axes and long upper edge 636 of "C"-shaped belt guide aligns generally with lower edge of forward extending wing. "C"-shaped belt guides have belt guide extensions 622 and further extending offset bosses 624 with axis 626. Extending boss slidably penetrates hole 644 in forward extending wing. Screw 628 and washer 630 secure "C"-shaped belt guide to forward extending wing and compression spring 632 encourages belt guide extension upper surface 634 against forward extending wing lower surface 638. "C"-shaped belt guide may be located in one of two positions, one shown in FIG. 21 where "C"-shaped belt guide face "A" 640 mates with forward facing wing outer facing surface 642 and one shown in FIG. 22 where "C"-shaped belt guide face "B" mates with wing outer facing surface. It can be seen that "C"-shaped belt guide belt opening 648 moves forward or rearward depending on whether face "A" or face "B" is aligned with wing outer facing surface 642. Pulling downward on "C"-shaped belt guide and rotating it on the offset boss axis achieves the transposition of faces.

Figure 24:
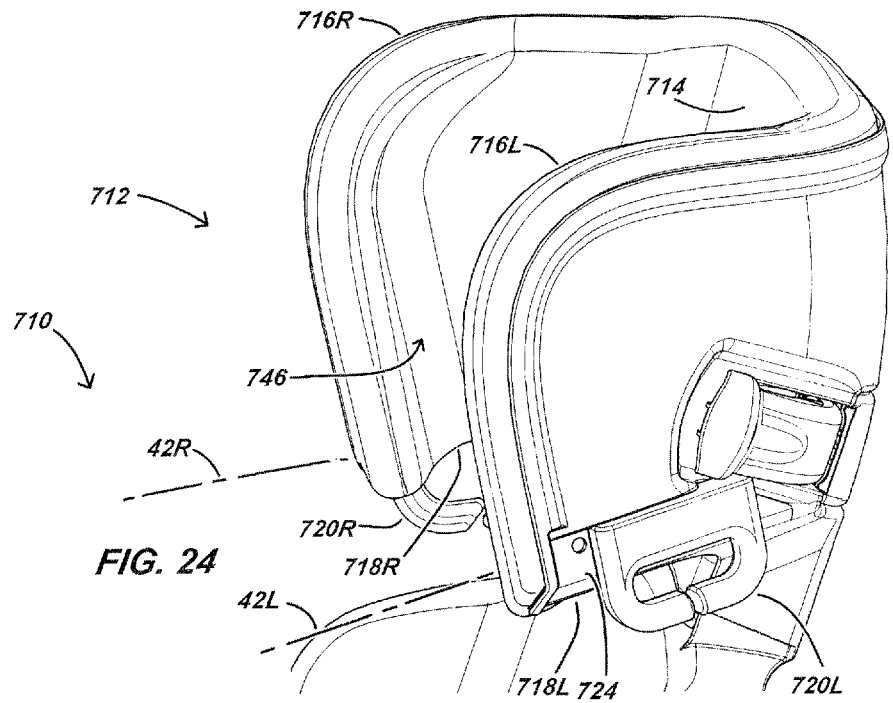
FIG. 24 is a partial side perspective view which shows an embodiment of the "C"-shaped belt guide where the belt guide can be lifted and slid to at least one alternate position different from the rearward position shown.
Figure 25:
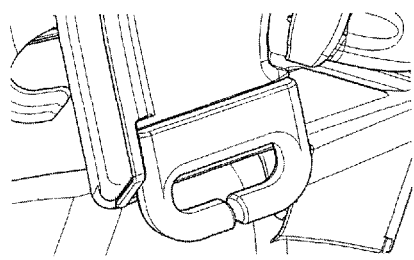
FIG. 25 is a side elevational view which shows the "C"-shaped belt guide of FIG. 24 in a forward position.
Figure 26:
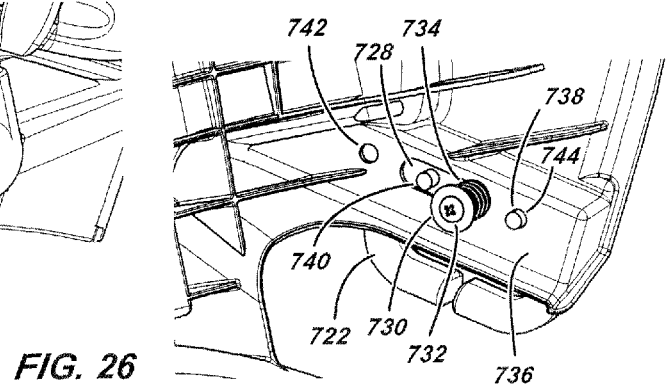
FIG. 26 is an inside perspective view of the operational components of FIG. 24 with a foam liner removed.

A final sixth embodiment is shown in FIG. 24, FIG. 25, and FIG. 26 where a "C"-shaped belt guide moves forward or rearward on a defined axis. Here again, booster car seat 710 has extendable headrest 712 with back surface 714 and forward extending wings 716L and 716R with lower edges 718L and 718R, and previously defined axes 42L and 42R. Note that FIG. 24 shows a foam liner 746 but FIG. 26 shows foam liner removed for clarity. "C"-shaped belt guide 720L and 720R are moveably attached to forward extending wings and may move toward or away from back surface along axes. An inner surface 722 of "C"-shaped belt guide generally mates with an outer surface 724 of forward extending wing. Boss 726 is attached as a part of the inner surface of "C"-shaped belt guide and penetrates elongated slot 728 proximate lower edge of forward extending wing and is capped by washer 730 retained by screw 732. Compression spring 734 between washer and inner surface 736 of forward extending wing biases "C"-shaped belt guide into contact with the outer surface of forward extending wing. One or more protrusions 738 and 740 project from inner surface of "C"-shaped belt guides and may engage with at least two engagement detents or holes 742 and 744 in forward extending wings. In one position at least one protrusion on "C"-shaped belt guide engages at least one engagement detent on forward extending wing fixing "C"-shaped belt guide in one position. "C"-shaped belt guide may be pulled outward disengaging the engaging protrusion and engagement detent. "C"-shaped belt guide may then be slid to an alternate position as shown in FIG. 25 where an alternate protrusion and engagement detent may engage upon release. Although this embodiment is illustrated with two positions for clarity, any number of positions may be accommodated in the invention. Like the other embodiments, this configuration is easy to see, easy to understand, easy to use and can accommodate the previously described auto seat belt mounting locations. It is also simple, easy to manufacture, and reliable.

Figure 27:
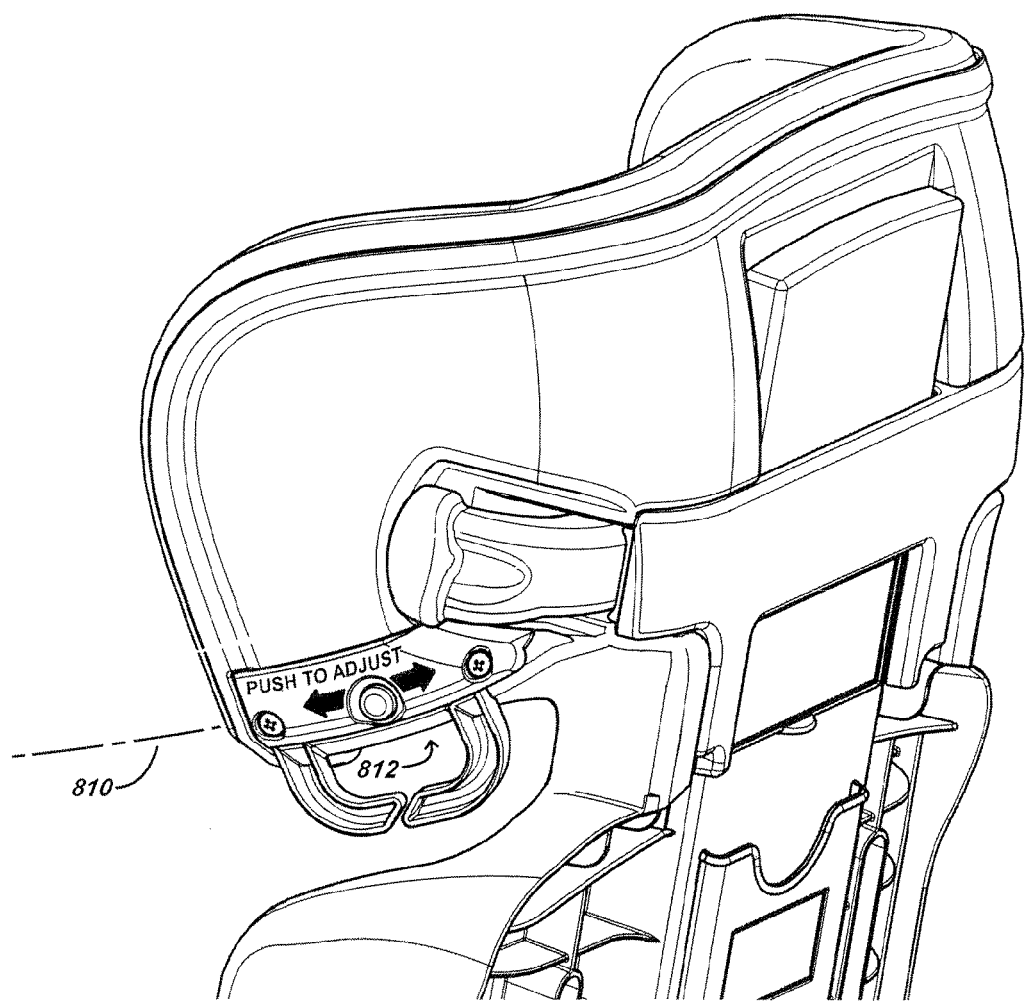
FIG. 27 is a rear perspective view of a non-linear (e.g., curvilinear) length of travel for the belt guide.

Although the adjustment axis previously described is created by the intersection of planes, those planes can be described as surfaces instead of planes and may be arced surfaces. Thus, the intersection of the arced surfaces creates an arced adjustment axis (i.e., non-linear) and the "C"-shaped adjuster may move on an arced path or even a spline or an irregular curve (i.e., non-linear). Referring to FIG. 27, the booster seat represented in FIG. 1 is shown to have a curvilinear adjustment axis 810 and lower edge 812. Although all embodiments have been shown with a preferred linear adjustment path, the described curvilinear path is within the spirit of the invention. In this embodiment, the curvilinear path in general will be similar geometrically to the lower edge of each forward extending wing, although it does not necessarily have to be. It is possible for the lower edge of the forward extending wing to have a first non-linear geometry and the adjustment axis have a second non-linear geometry.

In the above embodiments, many minor variations are foreseen and immaterial to the invention. For example, the spring biased plungers and push buttons may be unified or compression springs may be replaced by any common spring type or even molded integrally with any of the noted components. The assemblies could easily be reversed with push actions becoming pull actions required to adjust the "C"-shaped belt guide or even inverted. Features and details from any embodiment may be combined.

The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A booster car seat with a seat and a back and a headrest which comprises:
   (a) a headrest back surface interposed between left and right forward extending side wings, each wing with a lower edge; and
   (b) a left and a right belt guide proximate each of said lower edges and wherein each belt guide is adjustable to one of at least two positions along a respective adjustment axis of each of said left and right belt guide and wherein each adjustment axis is along a portion of a line formed by an intersection of two planes, said intersection formed by,
      (i) a vertical splay plane formed by a parallel plane offset from a plane angled to a vertical centerline plane and which passes through a back axis of said seat and wherein said splay angle ranges from approximately 0° to 45°; and
      (ii) a horizontal declination plane angled from a back plane which is normal to said centerline plane and wherein said declination angle ranges from approximately 80° to 150°.

2. The seat of claim 1 which further comprises:
   a foam inner liner interior of an outer shell of said wings, said inner liner being thicker at a region adjacent a periphery of said wings than at a non-peripheral region of said wings.

3. The seat of claim 1 wherein
said splay angle ranges from approximately 10° to 30°; and
said declination angle ranges from approximately 100° to 140°.

4. The seat of claim 1 wherein
said belt guide moves between said at least two positions by selective biased engagement between at least one slot and one mating projection.

5. The seat of claim 1 wherein
said belt guide moves between said at least two positions by selective biased engagement between two slots and mating projections.

6. The seat of claim 1 wherein
said belt guide moves between said at least two positions by rotational movement of a threaded screw.

7. The seat of claim 1 wherein
said belt guide moves between said at least two positions by rotational movement of an internally threaded knob about a mating externally threaded screw.

8. The seat of claim 1 wherein
said belt guide moves between said at least two positions by rotational movement about an axis normal to said lower edge of each of said wings and insertion of an offset boss into a mating offset hole in said lower edge.

9. The seat of claim 1 wherein
said belt guide moves between said at least two positions by selective engagement between at least two laterally positioned slots and at least one laterally biased mating projection.

10. A booster car seat with a seat and a back and a headrest wherein
(a) said headrest has a headrest back surface, and left and right forward extending side wings each with a lower edge;
(b) a left and a right belt guide proximate each said lower edge and where each belt guide is adjustable to one of at least two positions nearer or farther from said headrest back surface; and
(c) wherein said at least two positions lie on a common axis, and wherein said common axis is determined by:
(i) a splay approximating said forward extending wings from a center plane of said booster car seat and wherein said splay ranges from approximately 0° to 45°; and
(ii) a declination from a back surface plane of said seat and wherein said declination ranges from approximately 80° to 150°.

11. The seat of claim 10 wherein
said belt guide moves between said at least two positions by selective engagement between at least two laterally positioned slots and at least one laterally biased mating projection.

12. The seat of claim 10 which further comprises:
a foam inner liner interior of an outer shell of said wings,
said inner liner being thicker at a region adjacent a periphery of said wings than at a non-peripheral region of said wings.

13. The seat of claim 10 wherein
said splay ranges from approximately 10° to 30°; and
said declination ranges from approximately 100° to 140°.

14. The seat of claim 10 wherein
said belt guide moves between said at least two positions by selective biased engagement between at least one slot and one mating projection.

15. The seat of claim 10 wherein
said belt guide moves between said at least two positions by selective biased engagement between two slots and mating projections.

16. The seat of claim 10 wherein
said belt guide moves between said at least two positions by rotational movement of a threaded screw.

17. The seat of claim 10 wherein
said belt guide moves between said at least two positions by rotational movement of an internally threaded knob about a mating externally threaded screw.

18. The seat of claim 10 wherein
said belt guide moves between said at least two positions by rotational movement about an axis normal to said lower edge of each of said wings and insertion of an offset boss into a mating offset hole in said lower edge.

19. A booster car seat with a seat and a back and a headrest wherein
(a) said headrest has a headrest back surface, and left and right forward extending side wings each with a lower edge;
(b) a left and a right belt guide proximate each said lower edge and where each belt guide is adjustable to one of at least two positions nearer or farther from said headrest back surface; and
(c) wherein said at least two positions lie on a common axis, and wherein said common axis is determined by:
(i) a splay approximating said forward extending wings from a center plane of said booster car seat; and
(ii) a declination from a back surface plane of said seat; and further wherein
(d) said belt guide moves between said at least two positions by rotational movement of a threaded screw.

20. The seat of claim 19 wherein
said splay ranges from approximately 4° to 45°; and
said declination ranges approximately from 80° to 150°.

21. The seat of claim 20 wherein
said splay ranges from approximately 10° to 30°; and
said declination ranges from approximately 100° to 140°.

22. A booster car seat with a seat and a back and a headrest wherein
(a) said headrest has a headrest back surface, and left and right forward extending side wings each with a lower edge;
(b) a left and a right belt guide proximate each said lower edge and where each belt guide is adjustable to one of at least two positions nearer or farther from said headrest back surface; and
(c) wherein said at least two positions lie on a common axis, and wherein said common axis is determined by:
(i) a splay approximating said forward extending wings from a center plane of said booster car seat; and
(ii) a declination from a back surface plane of said seat; and further wherein
(d) said belt guide moves between said at least two positions by rotational movement of an internally threaded knob about a mating externally threaded screw.

23. The seat of claim 22 wherein
said splay ranges from approximately 4° to 45°; and
said declination ranges approximately from 80° to 150°.

24. The seat of claim 23 wherein
said splay ranges from approximately 10° to 30°; and
said declination ranges from approximately 100° to 140°.

25. A booster car seat with a seat and a back and a headrest wherein (a) said headrest has a headrest back surface, and left and right forward extending side wings each with a lower edge;
(b) a left and a right belt guide proximate each said lower edge and where each belt guide is adjustable to one of at least two positions nearer or farther from said headrest back surface; and
(c) wherein said at least two positions lie on a common axis, and wherein said common axis is determined by:
  (i) a splay approximating said forward extending wings from a center plane of said booster car seat; and
  (ii) a declination from a back surface plane of said seat; and further wherein
(d) said belt guide moves between said at least two positions by rotational movement about an axis normal to said lower edge of each of said wings and insertion of an offset boss into a mating offset hole in said lower edge.

26. The seat of claim 25 wherein
said splay ranges from approximately 4° to 45°; and
said declination ranges approximately from 80° to 150°.

27. The seat of claim 26 wherein
said splay ranges from approximately 10° to 30°; and
said declination ranges from approximately 100° to 140°.

* * * * *